United States Patent

Audeh

[15] 3,645,472

[45] Feb. 29, 1972

[54] HIGH-PERFORMANCE TAPE MEMORY SYSTEM

[72] Inventor: Azmi S. Audeh, Camarillo, Calif.

[73] Assignee: Ampex Corporation, Redwood City, Calif.

[22] Filed: Oct. 7, 1970

[21] Appl. No.: 78,661

[52] U.S. Cl. ....242/182, 226/97

[51] Int. Cl. ....G11b 15/58, G11b 23/12

[58] Field of Search ....242/180–186; 226/91, 95, 97, 118

[56] References Cited

UNITED STATES PATENTS

| | | | |
|---|---|---|---|
| 3,036,786 | 5/1962 | Mammel | 242/181 |
| 3,380,682 | 4/1968 | Georgantas et al. | 242/182 |
| 3,393,878 | 7/1968 | Aweida et al. | 242/182 |
| 3,563,492 | 2/1971 | Ferrier, Jr. | 242/184 |

*Primary Examiner*—Leonard D. Christian
*Attorney*—Robert G. Clay

[57] ABSTRACT

A digital magnetic tape transport utilizes two vacuum storage chambers, a magnetic head and a capstan positioned along a straight-line tape-threading path between a supply reel and a takeup reel. The vacuum chambers are asymmetrically disposed with similar but differing inclinations to provide maximum chamber length as well as a sufficient wrap on the capstan to prevent slippage, while being confined within the outline of a standard mounting rack. Such an arrangement also decreases the number of tape guides while increasing tape stability, avoids frictional contact between the capstan and the oxide surface of the tape, and is particularly suited for automatic and cartridge loading.

9 Claims, 1 Drawing Figure

Patented Feb. 29, 1972 3,645,472
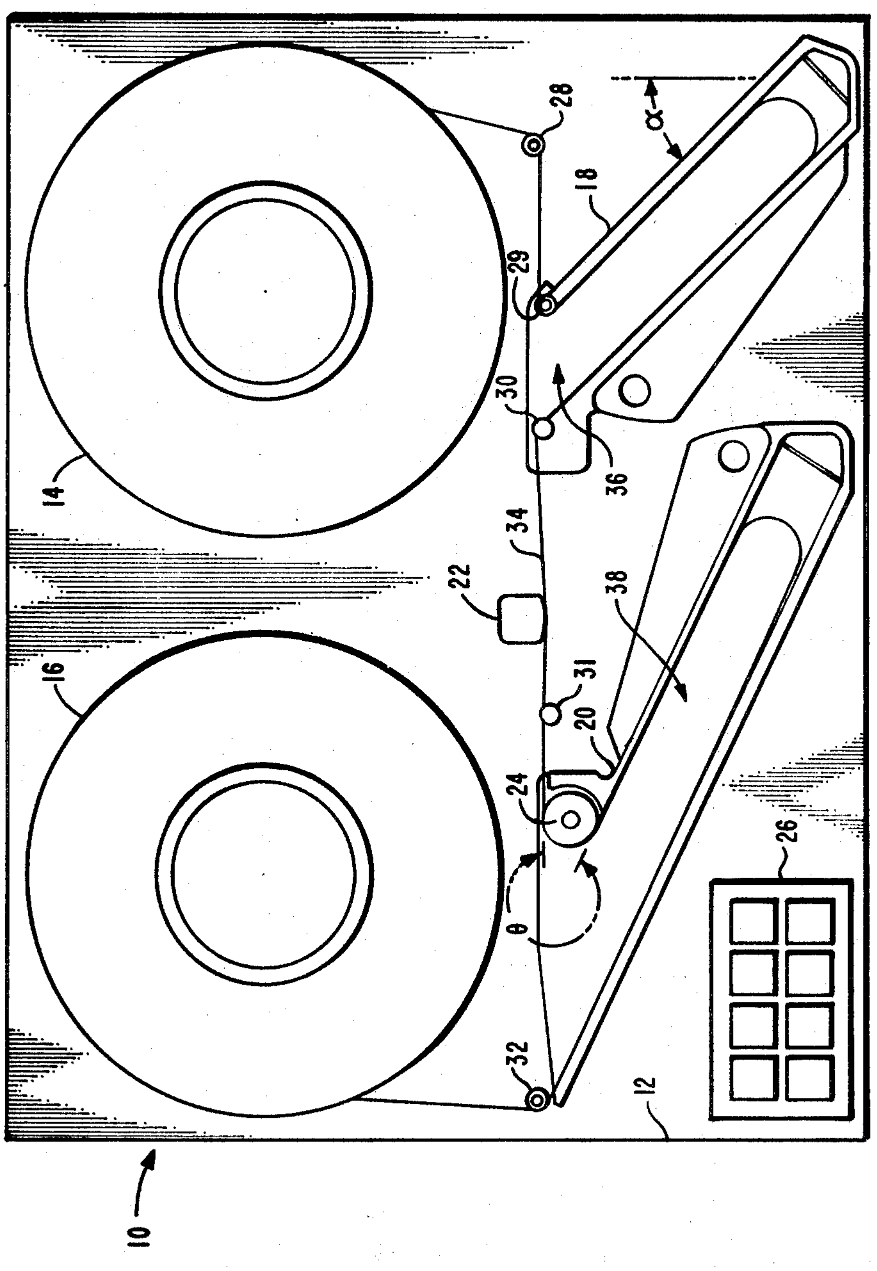
INVENTOR.
AZMI S. AUDEH
BY Fraser and Bogucki
ATTORNEYS

HIGH-PERFORMANCE TAPE MEMORY SYSTEM

BACKGROUND OF THE INVENTION

1. Field of the Invention

This invention relates to magnetic tape transports and particularly to an improved configuration for a magnetic tape path for a digital magnetic tape transport of the single-capstan type.

2. History of the Prior Art

Digital magnetic tape transports move a magnetic tape intermittently and bidirectionally past a read-write head so that data may be read from or written on the tape during constant speed movement. A high speed intermittent drive system imparts the desired motion to the tape in the vicinity of the heads. However, the tape reels and reel motors have substantially larger inertia and it is impractical to require that they follow the rapid reversals, accelerations and decelerations of the tape drive. For this reason a buffer mechanism, usually a tape storage arm or vacuum chamber, is placed between the capstan and each reel. Thus, when a sudden reversal by the capstan causes it to draw or supply tape faster than a reel can unwind or wind, the excess tape can be supplied or stored by the buffer device and the slower acting reel can be controlled with a degree of independence of the tape drive.

Single-capstan tape transports using vacuum storage chambers comprise two tape reels, two vacuum chambers, a magnetic read-write head and a capstan mounted on a rectangular surface to form a magnetic tape path. The capstan itself is started and stopped under electronic control to change the tape velocity. While some high performance transports are stand alone units, there is much demand for transports fitting the standardized relatively small mounting rack dimension of 19 × 24 inches of the data processing industry.

In one typical arrangement of a single-capstan system, the two reels are located on a horizontal line near the top of the rectangular mounting surface and vacuum storage chambers are mounted below the tape reels with a vertical orientation. The magnetic head and capstan are located above the mouths of the two vacuum chambers. This typical arrangement has bends in the tape path that make automatic threading somewhat inconvenient and because of the long vertical chambers cannot fit on a standard mounting rack.

In a different typical arrangement that is more compact, the vacuum chambers are mounted in facing relationship, either along the same line or at symmetrical angles to a central region in which the drive system and head are generally located. This arrangement, however, can provide only limited chamber length and generally does not permit automatic threading whatever the disposition of the reels. Straight-line and automatic threading systems generally dispose the mouths of the chambers in a direct line between the reels, with one or two direct drive capstans being disposed at the corners of the vacuum chambers. Known systems of this type, however, generally use vertical vacuum chambers and, whatever the disposition of the reels, cannot provide adequate chamber length on a 19 ×24 inches rack in many instances.

SUMMARY OF THE INVENTION

A magnetic tape transport in accordance with the invention provides a straight-line tape-threading path with substantial wrap about a drive capstan and adequately long buffer loops by adjacent disposition of similarly inclined but asymmetrically disposed vacuum chambers.

In a specific example, two tape reels are mounted along a line parallel to one long side e.g., the top) of a rectangular tape deck and a substantially straight-line tape-threading path is defined along a horizontal line directly below the two reels. Two vacuum storage chambers having their mouths adjacent the straight-line tape-threading path extend downward at an oblique angle from the path. The angle of the first vacuum chamber provides a maximum length of vacuum chamber between the straight-line tape-threading path and the bottom of the tape deck. The second vacuum chamber includes the tape drive capstan at one corner of its open end and lies at an angle providing both a sufficient wrap angle around the capstan to insure proper drive without slippage and adequate chamber length. The head is disposed between the chambers.

This straight-line tape-threading path configuration greatly reduces the number of expensive tape guides that are needed and the absence of corners in the tape path across the magnetic head greatly increases tape stability. The extremely compact arrangement fits all necessary components within a standard-sized mounting rack with sufficient space between tape reels and vacuum storage chambers for convenient manual tape threading. In addition, the linear tape path configuration is easily adaptable to automatic or semiautomatic threading and cartridge loading.

BRIEF DESCRIPTION OF THE DRAWINGS

A better understanding of the invention may be had from a consideration of the following detailed description, taken in conjunction with the accompanying drawing, in which:

The figure is a schematic representation of a magnetic tape transport having a straight-line tape-threading path in accordance with the invention.

DETAILED DESCRIPTION

A magnetic tape transport in accordance with the present invention moves magnetic tape over a straight-line path including a first vacuum storage chamber, a magnetic recording head, a capstan, and a second vacuum storage chamber respectively spaced along and defining the straight-line path. The tape moves between the two reels positioned adjacent the tape path.

As shown in FIG. 1, a magnetic tape transport 10 in accordance with the invention comprises a rectangular mounting frame 12, here of standardized 19 ×24 inches rack dimensions. Vertical, horizontal, or other emplacement may be used, but a typical mounting configuration is as shown in FIG. 1, with the frame 12 lying in a vertical plane, with the long sides being horizontal. A supply reel 14 and takeup reel 16 are mounted on spaced apart reel hubs whose centers lie along a horizontal line across the upper portion of the frame 12. Typical reels of 10½inches diameter, mounted with their upper edges adjacent the upper edge of the frame, therefore occupy a major portion of the frontal area of the frame 12. The terms "takeup" and "supply" are relative, inasmuch as the system is truly bidirectional and either reel may be fixed, or used as the file reel. A pair of vacuum chambers 18, 20, referred to as the right and left chambers, respectively, are mounted with their open ends along a linear tape-threading path that lies horizontally (in this example) across the frame 12. The chambers 18, 20 are similarly inclined but asymmetrically disposed, relative to the tape-threading path, and are spaced part with the magnetic head 22 being disposed along the tape-threading path between the chambers 18, 20, and the capstan 24 being disposed in the inner corner of the open end of the left chamber 20.

A number of tape guides 28, 29, 30, 31 and 32 are successively disposed along the tape path between the supply and takeup reels 14, 16, respectively. These guides may be fixed, air bearing or rotatable guides, and in some instances may merely be roller elements for driving tachometers. At the opposite ends of the tape-threading path, roller guides 28, 32 are disposed between the supply reel 14 and right-hand chamber 18 and the takeup reel 16 and left-hand chamber 20, respectively. The tape-threading path passes under these guides 28, 32, which insures that the tape lies directly across the mouths of the chambers 18, 20 when the operator merely draws the tape 34 under these two guides 28, 32 and between the head 22 and the remaining guides 29, 30, 31 during the loading process. The guides 28, 32 facilitate uniform reel packing as well, but are modified where automatic and semiautomatic loading system (not shown) are incorporated.

A turnaround guide 29 adjacent the outside wall at the open end of the right chamber 18 is a fixed guide element providing a low friction surface and edge guiding for the tape 34 in this region, in which a substantial angle exists when the tape loop is formed in the chamber 18. Fixed guides 30, 31 disposed adjacent the inner corner at the open end of the right-hand chamber 18 and between the head 22 and capstan 24 include edge-guiding shoulders (not shown in detail), for limiting lateral tape movement in the head region. These guides are somewhat larger than the other guides with the greater contact between tape and guides providing increased tape stability across the head 22.

Pushbutton controls 26 for manual operation and mode selection are also provided on the frame 12. In operation, after loops are formed in the chambers 18, 20, the capstan starts, stops and drives the magnetic tape 34 in either direction past the magnetic recording head 22 in response to command signals in a well-known manner. As the tape 34 passes by the head 22, data is written onto or read from the tape. In order to provide optimum efficiency, the capstan motor (not shown) is provided with a high ratio of torque to inertia so that it can accelerate and decelerate very rapidly. However, the tape reels are necessarily relatively high inertia components and any motor which could accelerate a tape reel varies with the amount of tape pack for a constant capstan speed. For these reasons, the supply and takeup reels 14, 16 are driven with a degree of independence of the capstan 24. The vacuum storage chambers 18, 20 permit this independent control by supplying or storing excess tape when the capstan is moving tape at a different rate than the associated tape reel. Servosystems which sense tape loop length within a vacuum chamber and control a reel motor in response thereto are well known and need not be described.

Arrangements in accordance with this invention suitably relate a number of different factors affecting the size, position and attitude of the vacuum chambers 18, 20. In order to minimize the amount of partial vacuum required within the vacuum storage chambers while insuring that tape will be pulled into the chambers when pulled across the mouth during loading the mouth should be as small as possible. The smallest mouth is attained by positioning the vacuum storage chambers perpendicular to the tape path. However, limitations are frequently placed on the size of the mounting frame 12, for instance limiting it to the standard size of 19 × 24 inches. For this reason, there may not be sufficient room to mount a vacuum chamber of adequate length vertically on the frame. Thus, for maximum utilization of space, the right-hand chamber 18 is mounted at an angle $\alpha$, relative to the vertical, with the closed end of the chamber 18 being in the corner of the frame 12. In order to minimize the size of the mouth opening, the angle $\alpha$ is chosen as the minimum angle which will allow a chamber of adequate length to fit between the tape path and the bottom of the mounting frame 12. Alternatively, design considerations may require that the position of the mouth of the the vacuum chamber 18 be fixed and that the angle $\alpha$ be chosen to maximize the length of the chamber 18. For the present arrangement it was found that the optimum angle $\alpha$ was 45°. This permitted a vacuum chamber having an operative length of 7.4 inches for an internal loop plus additional length for vacuum ports and alarm sensors which provide a signal when the tape loop becomes too long or too short and a small volume at the bottom of the chambers for establishing a partial vacuum.

The cover 36 of the right-hand vacuum storage chamber 18 extends slightly past the mouth of the chamber 18, covering tape guides 29, 30 at the mouth of the chamber on either side thereof. This slight extension restricts the flow of air between the tape-threading path and the internal portion of the vacuum chamber, increasing the effectiveness of the partial vacuum which pulls the tape 34 from the tape-threading path into the vacuum storage chamber 18.

Similarly, the cover 38 of the left-hand chamber 20 extends past the capstan 24 and part of the mouth of the chamber 20. However, the extension does not meet the roller guide 32 at the left-hand end of the tape threading path to provide an adequate space for passage of tape under the guide 32 during loading. It is also desirable to maximize the force drawing tape into the chamber 20 by minimizing the size of the mouth opening. This is done by disposing the chamber 20 as nearly perpendicular to the tape-threading path as possible. However, in the present instance the angle of the vacuum chamber 20 determines the wrap angle of the tape 34 on the capstan 24.

It is well known that the minimum wrap angle needed to insure no slippage between tape and capstan is determined by the formula $F=T(e\mu\theta-1)$ where $F$ is the maximum frictional driving force applied to the tape, $T$ is the nominal tension in the tape 34, $e$ is the base of the natural logarithm 2.178, $\theta$ is the angle of wrap around the capstan, and $\mu$ is the coefficient of friction between the tape 34 and the surface of the capstan 24. In the specifically disclosed arrangement, a wrap angle $\theta$ of 154° was established as desirable and the left-hand chamber 20 was accordingly positioned at an included angle of 26° relative to the tape threading path.

In this simplified straight line tape-threading path not only is the tape stability increased by reducing the number of turns, but many expensive tape guides are eliminated. In addition, manual loading is greatly simplified because the tape need only be strung along the straight line path defined by the lower surfaces of the guides 28, 32 and the magnetic head 22. The tape is then automatically pulled into the vacuum chambers 18, 20 by partial vacuum when the tape transport is set into the load mode in conventional fashion. Another advantage of the straight-line path is that it is easily adaptable to automatic or semiautomatic loading. This arrangement can be easily adapted to automatic loading by eliminating the guide 28 and repositioning guide 32 at the mouth of the vacuum chamber 20 to provide cornering similar to guide 29.

Although there has been described above a specific arrangement of a magnetic tape transport in accordance with the invention, for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A digital magnetic tape transport having a relatively straight-line tape-threading path suitable for automatic and semiautomatic tape loading comprising a magnetic head and a pair of vacuum storage chambers disposed on opposite sides of the magnetic head so as to define, together with the magnetic head, the relatively straight-line tape-threading path, the pair of vacuum storage chambers being similarly inclined but asymmetrically disposed relative to the relatively straight-line tape-threading path.

2. A digital magnetic tape transport mounted on a generally rectangular storage rack having a pair of long sides and a pair of short sides comprising:
   - first and second tape reels mounted on the storage rack along an axis generally parallel to the long sides;
   - means defining a substantially straight-line tape-threading path along the storage rack adjacent the reels and generally parallel to the long sides; and
   - a pair of similarly inclined vacuum storage chambers mounted on the storage rack, each having an open end adjacent the tape-threading path.

3. A digital magnetic tape transport according to claim 2, wherein the vacuum storage chambers are asymmetrically disposed relative to the tape-threading path, and further including a capstan mounted along the tape-threading path adjacent the open end of one of the vacuum storage chambers.

4. A digital magnetic tape transport having a generally linear tape-threading path and mounted on a vertically disposed rectangular frame having generally parallel upper and lower edges of long length and generally parallel left and right edges of short length comprising:

- a first tape reel mounted on the frame adjacent an upper right-hand corner defined by the upper and right edges;
- a second tape reel mounted on the frame adjacent an upper left-hand corner defined by the upper and left edges;
- first and second tape guides mounted on the frame along the linear tape-threading path below the first and second tape reels adjacent the right and left edges respectively;
- a first vacuum storage chamber mounted on the frame and having a bottom and terminating adjacent a lower right-hand corner defined by the lower and right edges and an open mouth terminating on the linear tape-threading path a sufficient distance to the left of the first tape guide to provide the first vacuum chamber with a desired tape loop forming length;
- third and fourth tape guides respectively mounted at opposite sides of the mouth of the first vacuum storage chamber;
- a second vacuum storage chamber mounted on the frame, having an open mouth terminating on the linear tape threading path adjacent the second tape guide and being disposed at an angle relative to the vertical sufficient to provide a nonslipping tape wrap angle around a capstan mounted at the open mouth thereof;
- a magnetic head mounted on the frame along the linear tape-threading path between the first and second vacuum storage chambers; and
- a fifth tape guide mounted on the frame along the linear tape-threading path between the magnetic head and the second vacuum storage chamber.

5. A digital magnetic tape transport comprising first and second spaced-apart vacuum storage chambers defining the opposite ends of a relatively straight-line tape-threading path, a magnetic recording head disposed along the straight-line tape-threading path between the first and second vacuum storage chambers, and a capstan disposed along the straight-line tape-threading path adjacent the second vacuum storage chamber, the first vacuum chamber being inclined relative to the straight-line tape-threading path to permit a maximum length thereof within available tape transport space and the second vacuum chamber being inclined relative to the straight-line tape-threading path in a direction similar to the first vacuum storage chamber to provide a sufficient wrap angle of tape around the capstan to prevent slippage between tape and capstan.

6. A digital magnetic tape transport according to claim 5, wherein the wrap angle of tape around the capstan is determined in accordance with the formula $F=T(e\mu\theta-1)$, where $F$ is the maximum frictional driving force applied to the tape, $T$ is the nominal tape tension, $e$ is the base of the natural logarithm 2.178, $\mu$ is the coefficient of friction between the tape and capstan surface, and $\theta$ is the wrap angle of tape.

7. For use on a digital magnetic tape transport mounted on a standardized rectangular frame and having first and second reels mounted on an upper portion of the frame at opposite sides thereof, means defining a generally linear tape-threading path including:

- first and second tape guides mounted on the frame at opposite sides thereof below the first and second reels, the first and second tape guides establishing the opposite ends of the generally linear tape-threading path;
- a first vacuum storage chamber mounted on the frame and having a bottom terminating at a lower corner of the frame and an open mouth terminating on the generally linear tape-threading path, the angular position of the first vacuum storage chamber relative to the generally linear tape-threading path being chosen so as to optimize both the size of the open mouth along the generally linear tape-threading path and the length of the first vacuum storage chamber accommodated by the rectangular frame;
- a second vacuum storage chamber mounted on the frame and having an open mouth terminating on the generally linear tape-threading path, the second vacuum storage chamber having an angular position relative to the generally linear tape-threading path similar to that of the first vacuum storage chamber and which is chosen so as to optimize the wrap angle of tape on a capstan located at the mouth of the second vacuum storage chamber;
- a capstan mounted at the mouth of the second vacuum storage chamber on a side thereof nearest the first vacuum storage chamber; and
- a magnetic head mounted on the frame along the generally linear tape-threading path between the first and second vacuum storage chambers.

8. The combination defined in claim 7, wherein the frame has dimensions of 19 inches by 24 inches and the first and second reels each have a diameter of 10½ inches.

9. The combination defined in claim 8, wherein the first vacuum storage chamber is mounted on the frame at an angle of approximately 45° relative to the generally linear tape-threading path and the second vacuum storage chamber is mounted to provide a wrap angle of tape on the capstan of approximately 154°.

* * * * *